United States Patent
Wernersson et al.

(10) Patent No.: US 12,191,951 B2
(45) Date of Patent: Jan. 7, 2025

(54) SCALABLE METHOD FOR OBTAINING UE-SPECIFIC CSI

(71) Applicant: Telefonaktiebolaget LM Ericsson (publ), Stockholm (SE)

(72) Inventors: Niklas Wernersson, Kungsängen (SE); Maksym Girnyk, Solna (SE); Roy Timo, Kungsängen (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 373 days.

(21) Appl. No.: 17/299,088

(22) PCT Filed: Dec. 5, 2018

(86) PCT No.: PCT/SE2018/051251
§ 371 (c)(1),
(2) Date: Jun. 2, 2021

(87) PCT Pub. No.: WO2020/117106
PCT Pub. Date: Jun. 11, 2020

(65) Prior Publication Data
US 2022/0069879 A1    Mar. 3, 2022

(51) Int. Cl.
*H04B 7/06*    (2006.01)
*H04L 5/00*    (2006.01)

(52) U.S. Cl.
CPC ......... *H04B 7/0626* (2013.01); *H04B 7/0639* (2013.01); *H04B 7/0658* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 9,647,494 B2* | 5/2017 | Hui | H04L 45/28 |
| 2010/0009694 A1* | 1/2010 | Fischer | H04W 52/0206 |
| | | | 455/452.1 |

(Continued)

FOREIGN PATENT DOCUMENTS

| | | |
|---|---|---|
| EP | 3185436 A1 | 6/2017 |
| EP | 3285424 A1 | 2/2018 |

(Continued)

OTHER PUBLICATIONS

"Hybrid CSI Reporting with One and Two CSI Processes", 3GPP TSG-RAN WG1#86; R1-167640; Gothenburg, Sweden, Aug. 22-26, 2016, pp. 1-9.

(Continued)

*Primary Examiner* — Noel R Beharry
*Assistant Examiner* — Liem H. Nguyen
(74) *Attorney, Agent, or Firm* — Sage Patent Group

(57) ABSTRACT

The present disclosure relates to a method performed by a wireless node (100) for transmitting reference symbols, the node comprising an antenna with a plurality of antenna ports, the method comprising configuring channel state information, CSI, measurements of a user equipment, UE (110), by transmitting a downlink message, transmitting a first reference symbol using the plurality of antenna ports, wherein the first reference symbol is transmitted using a first number N of antenna ports, transmitting a second reference symbol using the plurality of antenna ports, wherein the second reference symbol is transmitted using a second number K of antenna ports, wherein the first reference symbol is transmitted using a first port distance smaller than a second port distance used when transmitting the second reference symbol, and wherein the K used antenna ports are less than the N used antenna ports.

15 Claims, 12 Drawing Sheets

(56) References Cited

U.S. PATENT DOCUMENTS

| | | | |
|---|---|---|---|
| 2016/0156401 A1* | 6/2016 | Onggosanusi | H04B 7/0482 370/329 |
| 2016/0165457 A1* | 6/2016 | Inoue | H04B 7/0479 455/562.1 |
| 2016/0269084 A1* | 9/2016 | Nam | H04B 7/0469 |
| 2016/0359538 A1* | 12/2016 | Onggosanusi | H04B 7/0478 |
| 2017/0237478 A1* | 8/2017 | Kwak | H04B 7/0639 370/329 |
| 2017/0288758 A1* | 10/2017 | Kakishima | H04B 7/0478 |
| 2018/0041258 A1* | 2/2018 | Tong | H04B 7/0632 |
| 2018/0062715 A1* | 3/2018 | Li | H04L 1/06 |
| 2018/0184441 A1* | 6/2018 | Faxér | H04W 72/54 |
| 2018/0198499 A1* | 7/2018 | Park | H04B 7/0626 |
| 2018/0205437 A1* | 7/2018 | Kim | H04B 7/0639 |
| 2019/0028913 A1* | 1/2019 | Park | H04L 25/02 |
| 2019/0036579 A1* | 1/2019 | Wei | H04B 7/0479 |
| 2019/0044600 A1* | 2/2019 | Milleth | H04B 7/0695 |
| 2019/0058560 A1* | 2/2019 | Chen | H04B 7/0417 |
| 2020/0059276 A1* | 2/2020 | Monir Vaghefi | H04L 25/0224 |
| 2020/0059955 A1* | 2/2020 | Rahman | H04B 7/0417 |
| 2020/0204239 A1* | 6/2020 | Kang | H04B 7/0632 |
| 2020/0304178 A1* | 9/2020 | Wei | H04L 5/005 |
| 2021/0135485 A1* | 5/2021 | Demaree | H02J 9/061 |
| 2022/0070694 A1* | 3/2022 | Xu | H04B 7/0417 |

FOREIGN PATENT DOCUMENTS

| | | |
|---|---|---|
| JP | 2015033097 A | 2/2015 |
| WO | 2014157867 A1 | 10/2014 |
| WO | 2015101109 A1 | 7/2015 |
| WO | 2017190811 A1 | 11/2017 |

OTHER PUBLICATIONS

Extended European Search Report for European Patent Application No. 18942053.2 mailed Jun. 20, 2022, 7 pages.

* cited by examiner

SCALABLE METHOD FOR OBTAINING UE-SPECIFIC CSI

TECHNICAL FIELD

The present disclosure relates to a method and network node for obtaining user equipment, UE, specific channel state information, CSI.

BACKGROUND

In wireless communication systems, information is transmitted wirelessly between the different wireless devices of the system. Examples of such wireless communication systems are fifth generation cellular networks (5G) or New Radio (NR) applying channel tracking and handling the beam tracking/beam refinement between the nodes and UEs. For example, information may be transmitted downlink, (DL) from a network node such as a base station (BS) to a wireless device such as a user equipment (UE) or, or uplink (UL) from the wireless device to the network node. New frequency bands are being considered, for example in the range of 6-100 GHz. These bands offer wide spectrum for high data rate communications, however, the coverage range is limited, which to a degree can be compensated for by using multi-antenna techniques, such as beamforming transmission.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Long Term Evolution, LTE, standard is currently evolving with enhanced MIMO support. A core component in LTE is the support of MIMO antenna deployments and MIMO related techniques. LTE release 13 supports spatial multiplexing for 16 elements transmission, Tx, antennas with channel dependent precoding. The spatial multiplexing mode is aimed for high data rates in favorable channel conditions.

In LTE Release-10, a new reference symbol sequence, RS, was introduced for the intent to estimate channel state information, the CSI-RS. The CSI-RS provides several advantages over basing the CSI feedback on the common reference signal (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring on a CSI-RS, a UE can estimate the effective channel the CSI-RS is traversing including the radio propagation channel and antenna gains.

For CSI feedback LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state.

In LTE the CSI feedback is given in terms of a transmission rank indicator (RI), a precoder matrix indicator (PMI), and one or two channel quality indicator(s) (CQI). The CQI/RI/PMI report can be wideband or frequency selective depending on which reporting mode that is configured.

The RI corresponds to a recommended number of streams that are to be spatially multiplexed and thus transmitted in parallel over the effective channel. The PMI identifies a recommended precoder (in a codebook which contains precoders with the same number of rows as the number of CSI-RS ports) for the transmission, which relates to the spatial characteristics of the effective channel. The CQI represents a recommended transport block size (i.e., code rate) and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

Obtaining CSI-RS using all antenna ports of a MIMO antenna requires a large number of physical resources and some conventional systems therefore apply hybrid CSI reporting. A common use case for hybrid CSI reporting is where a first CSI process has a relatively large number of CSI-RS ports and is transmitted relatively infrequently, while a second CSI process has a relatively small number of CSI-RS ports and is transmitted relatively frequently. A UE can report CSI feedback using either the first or second CSI process. See e.g. R1-167640, R1-167640, Gothenburg, Sweden 22-26 Aug. 2016.

Thus there is a need to provide a solution which mitigates or solves the described drawbacks and problems

SUMMARY

An objective of embodiments of the invention is to provide a solution which mitigates or solves the drawbacks and problems described above. The above objectives are achieved by the subject matter described herein. Further advantageous embodiments or implementation forms of the invention are also defined herein.

According to a first aspect of the invention, the above mentioned and other objectives are achieved with a method performed by a wireless node for transmitting reference symbols, the node comprising an antenna with a plurality of antenna ports, the method comprising configuring channel state information, CSI, measurements of a user equipment, UE, by transmitting a downlink message, transmitting a first reference symbol using the plurality of antenna ports, wherein the first reference symbol is transmitted using a first number N of antenna ports, transmitting a second reference symbol using the plurality of antenna ports, wherein the second reference symbol is transmitted using a second number K of antenna ports, wherein the first reference symbol is transmitted using a first port distance smaller than a second port distance used when transmitting the second reference symbol, and wherein the K used antenna ports are less than the N used antenna ports.

At least an advantage of the invention according to the first aspect is that overhead due to transmission of CSI-RS does not grow with the number of users.

According to a second aspect of the invention, the above mentioned and other objectives are achieved with a wireless node for transmitting reference symbols.

The advantages of the invention according to the second aspect are at least the same as for the first aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
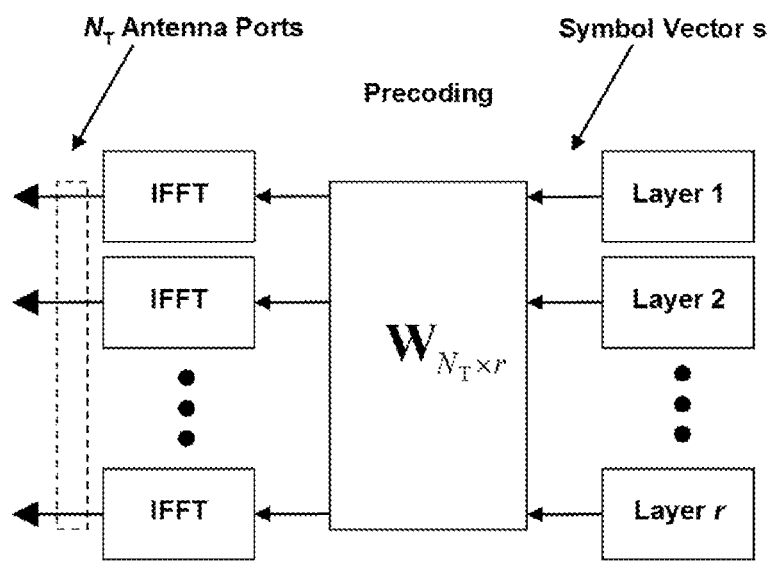
FIG. 1 illustrates a spatial multiplexing operation according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Although terminology from 3GPP LTE has been used in this disclosure to exemplify the invention, this should not be seen as limiting the scope of the invention to only the aforementioned system. Other wireless systems, especially 5G/NR, WCDMA, WiMax, UMB and GSM, may also benefit from exploiting the ideas covered within this disclosure.

The term "reference symbol" is used interchangeably herein with the term "reference signal".

The term "subspace" is used interchangeably herein with the term "channel subspace" and denotes focusing the transmitted energy into a subspace of a cell relatively to the space covered by the total cell. In some aspects of the invention, focusing the transmitted energy into a subspace where the UE is located is denoted transmitting in a UE specific manner. In some aspects of the invention, transmitting to the entire or a large part of the cell is denoted transmitting in a cell specific manner.

In one example, all antenna ports of an antenna are used to transmit in a cell specific manner, and a single antenna port is used to transmit in in a UE specific manner.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. The present disclosure, to some extent, focuses on wireless transmissions in the downlink, but the invention is equally applicable in the uplink.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. LTE release 13 supports spatial multiplexing for 16 Tx antennas with channel dependent precoding. The spatial multiplexing mode is aimed for high data rates in favorable channel conditions.

FIG. 1 illustrates a spatial multiplexing operation according to one or more aspects of the present disclosure. As seen in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder can be a wideband precoder, which is constant over frequency, and/or be a frequency selective precoder.

The precoder matrix is often chosen to match the characteristics of the $N_R \times N_T$ MIMO channel matrix $H_n$, resulting in so-called channel dependent precoding. One is often striving for focusing the transmit energy into a subspace which is strong in the sense of conveying much of the transmitted energy to the UE. Furthermore, the transmission rank, and thus the number of spatially multiplexed layers, is reflected in the number of columns of the precoder. For efficient performance it is therefore central to obtain information about the channel $H_n$, this information is commonly referred to as channel state information (CSI).

Channel State Information Reference Signals (CSI-RS)

CSI-RS In more mathematical rigor, this implies that if a known CSI-RS signal x is transmitted, a UE can estimate the coupling between the transmitted signal and the received signal (i.e., the effective channel H). Hence if no virtualization is performed in the transmission, the received signal y can be expressed as $$y = Hx + e$$

and the UE can estimate the effective channel H.

For CSI feedback, LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state.

In LTE the CSI feedback or reporting is given in terms of a transmission rank indicator (RI), a precoder matrix indicator (PMI), and one or two channel quality indicator(s) (CQI). The CQI/RI/PMI report can be wideband or frequency selective depending on which reporting mode that is configured.

The RI corresponds to a recommended number of streams that are to be spatially multiplexed and thus transmitted in parallel over the effective channel. The PMI identifies a recommended precoder (in a codebook which contains precoders with the same number of rows as the number of CSI-RS ports) for the transmission, which relates to the spatial characteristics of the effective channel. The CQI represents a recommended transport block size (i.e., code rate) and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

Precoded CSI-RS

In the above description of CSI-RS, so called non-precoded CSI-RS was assumed. This means conceptually that one CSI-RS antenna port is mapped to a single antenna element or antenna subarray of an antenna array. The CSI-RS in this case is then intended to be cell-specific, i.e. broadcasted over the entire cell coverage area. However, in LTE Rel. 13, a new type of CSI-RS transmitting scheme was introduced, so called beamformed or precoded CSI-RS. These CSI-RSs are intended to be UE-specific instead of cell-specific, so that each UE is assigned a dedicated CSI-RS resource. Such beamformed/precoded CSI-RS typically contain much fewer ports/antenna ports than non-precoded CSI-RS and typically spans a narrower main beam, as they are typically only intended to cover the UE of interest and not the entire cell coverage area. Using LTE terminology, non-precoded CSI-RS transmission schemes are denoted "Class A eMIMO-Type" while beamformed CSI-RS transmission schemes are denoted "Class B eMIMO-Type".

Beam Sweeping

An alternative way of utilizing precoded or beamformed CSI-RS is to transmit a sequence or subsequent sequence of beamformed CSI-RSs in order to cover the entire cell coverage area, so called beam sweeping. The beam sweeping approach is typically a necessity when using analogue beamforming at higher frequencies since the analogue beamforming network is typically wideband so that only a single beam can be transmitted in a given time instance. To cover the entire cell, the CSI-RS beam must be swept sequentially in time. However, beam sweeping is of course applicable to digital beamforming as well. Beam sweeping may be described as transmitting a sequence of different signals $x_k = W_k x'_k$ for different values of k. The UE can then measure the received signal corresponding to each k and feedback CSI corresponding to these measurements. Each precoder $W_k$ will correspond to a certain beam pattern and thus, several different beams are tested and evaluated. A drawback with this approach is that the number of precoders $W_k$ needed to be evaluated becomes quite large when the number of antennas in the array is large since the beam pattern generated by the array typically is very narrow.

Figure 2:
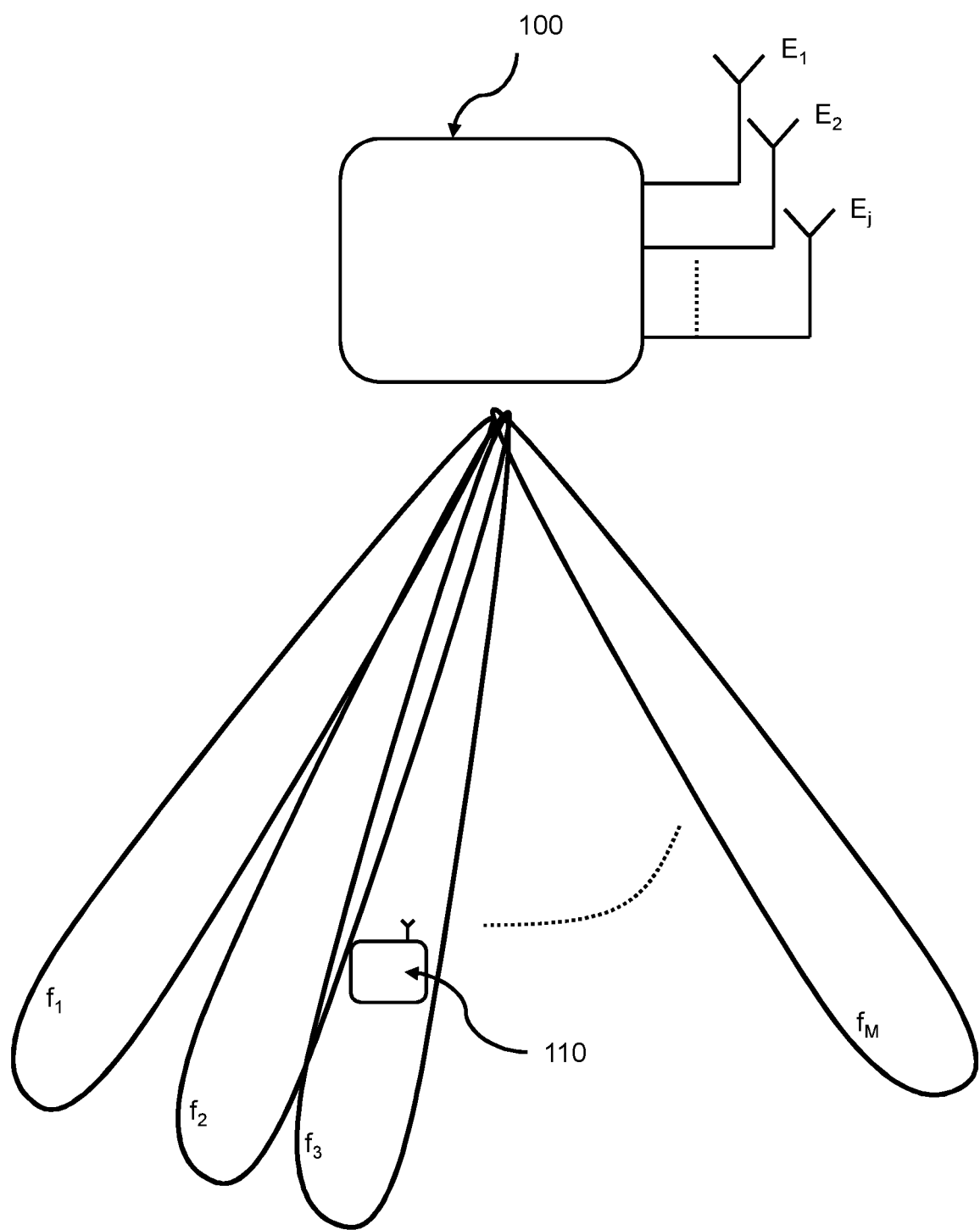
FIG. 2 illustrates antenna beams covering a cell area of a network node 100 according to one or more embodiments of the present disclosure.

FIG. 2 illustrates antenna beams covering a cell area of a network node 100 according to one or more aspects of the present disclosure.

A fixed codebook F is used at the TX side, e.g. at the network node 100, $F=\{f_1, f_2, \ldots f_M\}$. Each antenna beam of the codebook can be identified by and index m=1, ..., M and covers e.g. a sector of a network node cell area. Let us assume we know at UE position x the best set of antenna beam or optimal antenna beam shapes to be used for a particular channel H. According to the SVD of the channel H, the set of best beams is defined by the best transmitting beam $f_3$ to be used at the TX side.

As the UE antenna in the example shown in FIG. 2 is an omnidirectional antenna, only the network node's TX antenna beam is beamformed.

In one example, a first CSI-RS is transmitted using all antenna beams, simultaneously or by sweeping or subsequently transmitting the first CSI-RS using each of the antenna beams $\{f_1, f_2, \ldots f_M\}$. A second CSI-RS is later transmitted using a combined antenna beam comprising $\{f_2, f_3\}$.

Reciprocity Based CSI

For the previously presented CSI-RS transmission and beam sweeping techniques it is assumed that a CSI reference signal is transmitted in the downlink. The UE then measures the CSI-RS and feeds back CSI to the eNodeB. However, if transmitter-receiver reciprocity can be assumed, in one aspect of the present disclosure, the CSI can instead be estimated based on transmissions in the uplink. This is mainly applicable in TDD transmission and then enables a way to obtain CSI based on, for instance, SRS transmission.

CSI Port Distance

The present disclosure herein, uses the concept of antenna port distance and/or port distance and/or CSI-RS port distance when referring the geometrical distance between the phase centres of two transmitted RS antenna ports.

FIG. 3A-D illustrates 4 examples where CSI-RS is considered according to one or more aspects of the present disclosure. Only one of the antenna polarisations (vertical/horizontal/circular) are considered for illustrative purposes.

Figure 3A:
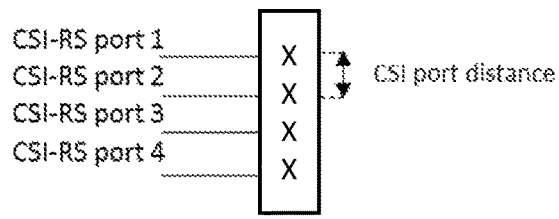
FIG. 3A-D illustrates 4 examples where CSI-RS is considered according to one or more embodiments.

The two first examples in FIG. 3A and FIG. 3 respectively, illustrate cases where each CSI-RS port is connected to one physical antenna. The CSI port distance then comprises the distance between the corresponding associated and/or coupled antenna elements.

Figure 3B:
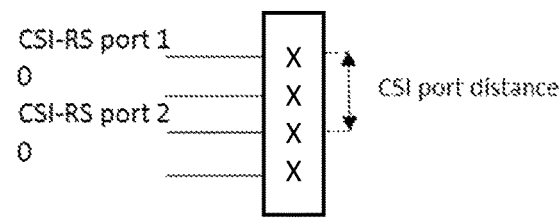

In one example shown in FIG. 3B, some of the physical antennas are not used, as illustrated with the signal "0", and hence only 2 out of 4 possible antennas are used in this example. Hence, here a 2 port CSI-RS is used, and the CSI-RS port distance is then defined from the corresponding antenna elements, i.e. the CSI-RS port distance is equal to two.

Figure 3C:
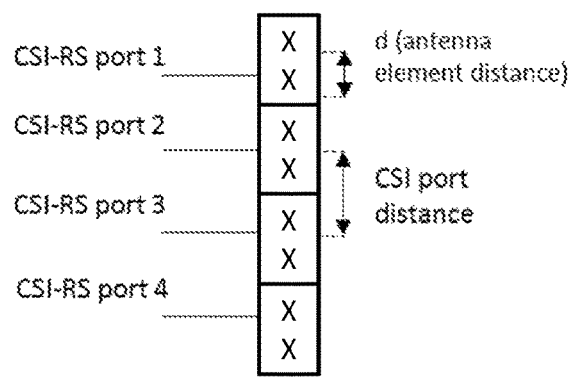
Figure 3D:
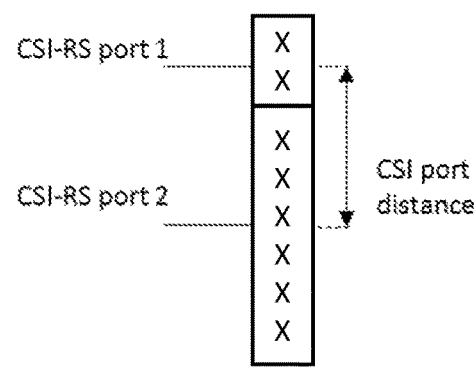

In the examples shown in FIGS. 3C and 3D, each CSI-RS port is instead virtualised to a group of antenna elements by some virtualisation matrix. The CSI port distance is then the distance between the centres of the respective group of antenna elements as illustrated in the two examples. As can be seen from the example in FIG. 3D, it is possible that the groups of antennas, corresponding to each CSI-RS port, may be of different sizes.

Finally, it is pointed out that the CSI-RS port distance is defined based on the properties of one polarization; if CSI-RS ports are used for multiple polarizations (horizontal, vertical, circular), the present disclosure defines one CSI port distance per type of polarization. Typically, but not necessary, these two distances will be the same or different.

Antenna Arrays

Figure 4:
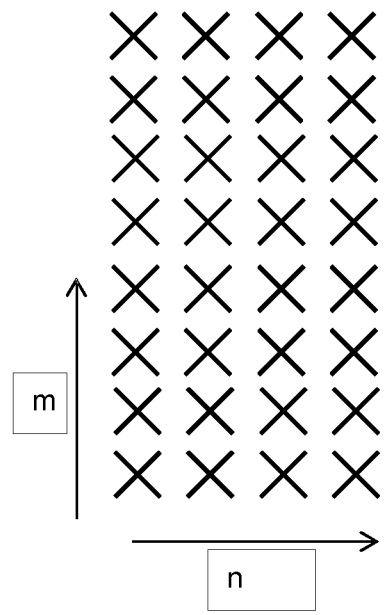
FIG. 4 illustrates a two-dimensional antenna array according to one or more embodiments of the present disclosure.

Recent development in 3GPP, has led to the discussion of two-dimensional antenna arrays where each antenna element has an independent phase and amplitude control, thereby enabling beamforming in both in the vertical and the horizontal spatial dimension. Such antenna arrays may be (partly) described by the number of antenna columns corresponding to the horizontal dimension $M_h$, the number of antenna rows corresponding to the vertical dimension $M_v$ and the number of dimensions corresponding to different polarizations $M_p$. The total number of antennas is thus $M=M_h M_v M_p$. A special subset of two dimensional 2D antenna arrays are one dimensional 1D arrays which is the set of antenna arrays where $M_h=1$ and $M_v>1$ or $M_h>1$ and $M_v=1$. An example of an antenna array where $M_h=4$ and $M_v=8$ is illustrated in FIG. 4. The antenna array comprises cross-polarized antenna elements meaning that $M_p=2$. The present disclosure denotes such an antenna as an 8×4 antenna array with cross-polarized antenna elements.

FIG. 4 illustrates a two-dimensional antenna array according to one or more aspects of the present disclosure. The antenna array comprises cross-polarized antenna elements $M_p=2$, with $M_h=4$ horizontal antenna elements and $M_v=8$ vertical antenna elements. In some aspects of the present disclosure, it is assumed that one antenna element corresponds to one antenna port.

The concept of an antenna element is non-limiting in the sense that it can refer to any virtualization (e.g., linear mapping) of a transmitted signal to the physical antenna elements. For example, groups of physical antenna elements could be fed the same signal, and hence they share the same virtualized antenna port when observed at the receiver. Hence, the receiver cannot distinguish and measure the channel from each individual antenna element within the group of antenna element that are virtualized together. Therefore, when transmitting for instance CSI-RS corresponding to NT antenna ports it is not necessarily so that NT equals the number of antenna elements used for the transmission. Hence, the number of antenna elements and the number of antenna ports may or may not need equal each other.

Beamwidth and Grating Lobes

When performing beamforming or precoding the width of the main beam can be partly quantified using the half power beam width, HPBW. The HPBW is largest interval within the main beam, for which the radiated power is at least half of the beam's maximum value. For DFT beams, the half power beam width, HPBW, is proportional to the number of antenna ports and inversely proportional to the antenna element spacing.

If the antenna spacing exceeds half of the subcarrier wavelength, then the array's power pattern can exhibit a type of aliasing whereby grating lobes (copies of the main lobe) appear within the array's visibility region. This effect is illustrated in FIG. 5a-f. System designs typically try avoiding grating lobes because they introduce angular uncertainty.

FIG. 5a-f Illustrates the half power beam width as well as the effect of grating lobes of a uniform linear antenna, ULA, comprising 8 copolarized omni-directional antenna elements with a DFT precoder aiming at 45 degrees for different values of the antenna elements separation da.

Hybrid CSI Schemes

In LTE release 13, support for 16 antenna ports CSI-RS is provided and as much as 32 antenna ports is likely to be specified in release 14. In NR rel-15, 32 antenna ports are supported. This enables powerful MIMO schemes which can radically improve system performance. However, a drawback by using a large number of CSI-RS antenna ports is that the overhead becomes larger and there will hence be less resources available for transmitting the actual data.

The present disclosure provides one possible remedy for this by operating in a hybrid CSI-RS reporting mode, thereby reducing overhead. A way to operate with hybrid CSI-RS reporting is illustrated in FIG. 6.

Figure 6:
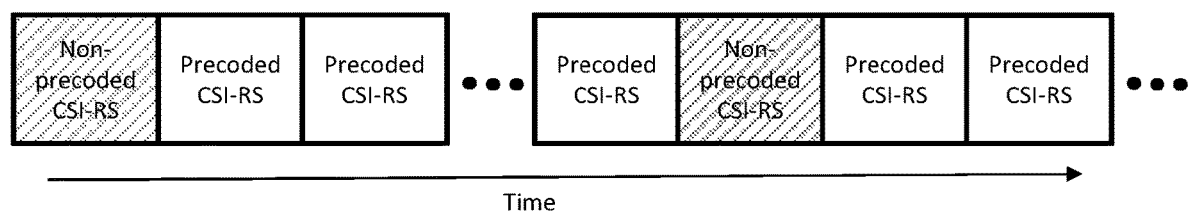
FIG. 6 illustrates operation in hybrid mode according to one or more embodiments of the present disclosure.

FIG. 6 illustrates operation in hybrid mode according to one or more aspects of the present disclosure.

The first non-precoded CSI-RS, illustrated by the striped boxes and corresponding to using a relatively high number of ports, is transmitted rather infrequently in a UE nonspecific manner; it is instead transmitted in a cell specific manner. In other words, the first CSI-RS is transmitted over the entire coverage area of the cell.

With reference to the example shown in FIG. 2, this may in one example correspond to that the first CSI-RS is transmitted using the antenna beams $f_1$ to $f_M$, i.e. in a cell specific manner.

Based on the corresponding CSI-RS reports, of the non-precoded CSI-RS, the eNodeB will be able to decide on or determine a channel subspace, e.g. $f_3$ shown in FIG. 2, where the UE 100 and potentially additional UEs are located. The second CSI-RS can then be transmitted using antenna beams $f_3$ only.

In a further example, a subspace is determined as antenna beams $f_1$, $f_3$ and $f_M$, i.e the second CSI-RS is transmitted using the antenna beams $f_1$, $f_3$ and $f_M$, e.g. by using every second antenna port.

The present disclosure provides the realization that the channels will be correlated in time, the network node 100, e.g. a eNodeB, can further utilize the decided/determined channel subspaces by assuming that the UEs will be located within these also in following or subsequent subframes. Hence, it may be sufficient for the network node 100 to transmit UE specific beamformed CSI-RS, using a low number of ports and/or a larger port distance, within the detected subspaces in the following or subsequent subframes. If the subspaces are small enough and/or the number of UEs are low enough this will result in a reduced overhead compared to transmitting only non-precoded CSI-RS. In other words, the overhead may be reduced by using a subset of antenna beams, e.g. $f_2$ and $f_3$, rather than using all the antenna beams, $f_1$-$f_M$. Hence, the eNodeB will efficiently be able to obtain high quality CSI with an, on average, lower overhead compared to the case where the eNodeB transmits only non-precoded CSI-RS.

It should be noted that the hybrid CSI scheme described above essentially comprises two phases:

Phase 1: Obtain CSI feedback corresponding to transmitting CSI-RS using a large number of ports and decide on a set of UE specific subspaces.

Phase 2: Obtain CSI for a UE using the decided UE specific subspace, or a smaller set of ports compared to phase 1, by transmitting precoded CSI-RS within a subspace.

It should be noted that performing these two phases by transmitting CSI-RS this is not the only way. In one alternative aspect of the present disclosure, we could for instance in the first phase instead rely on reciprocity or a beam sweeping procedure in order to obtain the required CSI. In the first or second phase we could utilize a beam sweep in order to obtain CSI. Hence, there are a number of different possible variants of hybrid CSI schemes based on the same main principle presented herein. Furthermore, for NR this approach may be of particular interest for high band operation since it is anticipated that analog antennas will be used to a large extent meaning that beam sweeping like algorithms will be used.

Hybrid CSI Applications

There may exist many situations where the hybrid CSI schemes presented herein are applicable. A few examples includes:

The hybrid CSI schemes may be applicable when using an antenna array with many steerable antennas (corresponding to a large number of antenna ports): Here we can in the first phase of the hybrid CSI scheme described above obtain CSI corresponding to a large number of antenna ports. This CSI will then be used to decide on a set of subspaces/spatial directions where the different UEs are located. These subspaces will then be used in the second phase by for instance transmitting precoded UE specific CSI-RS within the set if subspaces/subset of spatial directions/subset of antenna beams.

The hybrid CSI schemes may be applicable when using a large 2D antenna array corresponding to a large number of antenna ports: In the first phase, two sets of CSI may be obtained, where each set corresponds to one spatial domain. One may for instance use two CSI-RS processes where one of the processes corresponds to CSI in the elevation domain and the other set corresponds to CSI in the horizontal domain. By jointly utilizing these two sets of CSI we can in the first phase decide on a set of subspaces to be used in the second phase. These subspaces will then be used in the second phase by for instance transmitting precoded CSI-RS within the subspaces. This approach may be efficient in cases where for instance the CSI in the elevation domain has a longer coherence time than the CSI in the horizontal domain.

The hybrid CSI schemes may be applicable where the CSI can be divided into wideband and subband CSI in the frequency domain: Here the wideband CSI may be obtained in the first phase and a potentially frequency dependent subspace is decided. In the second phase, subband CSI is obtained by for instance transmitting precoded CSI-RS within the frequency dependent subspace.

The hybrid CSI schemes may be applicable when the CSI can be divided into co-phasing CSI within the same polarization and co-phasing between polarization CSI: Here the co-phasing CSI typically changes less rapidly and can thus be obtained in the first phase in order to decide on a subspace. The co-phasing of the polarizations typically changes more rapidly and therefore can be obtained in the second phase by for instance transmitting precoded CSI-RS within the decided subspace.

Problems with Conventional Solutions

A disadvantage of conventional solutions is that the number of UE-specific CSI-RS ports in Phase 2 may increase linearly with the number of UEs. Therefore, reference-signal overhead in phase 2 can increase linearly with the number of UEs. This linear port/overhead scaling is problematic for any system that employs a beam sweeping procedure. For example, analog-beamforming systems will need to sequentially sweep beams of the UEs' channel subspaces, one UE at a time. Digital beamforming systems can potentially overcome this problem, to some extent, by employing multi-user MIMO transmissions that exploit the UEs' spatial diversity. This approach, however, has the disadvantage that it requires accurate CSI and more complex signal processing at the eNodeB to control interference.

In a further aspect of the present disclosure, the above problems are solved by replacing the UE-specific CSI-RSs from phase 2 with a single cell-specific CSI-RS. The key idea is as follows:

Phase 1: The eNodeB sounds all of the UEs' channels in a cell-specific manner in the same way as Phase 1 described above. This implies that a total of Ntx CSI-RS ports is transmitted from the eNodeB, e.g. antenna beams $f_1$-$f_M$ shown in FIG. 2.

Phase 2: The eNodeB sounds a subspace, e.g. antenna beam $f_3$ shown in FIG. 2, of the UEs' channels by transmitting CSI-RS using a total of K<Ntx CSI-RS ports. This transmission is carried out in a cell specific manner. Furthermore, the transmission is carried out such that the CSI port distance of the CSI-RS is larger than the CSI port distance of the CSI-RS from phase 1. This will imply that the transmission constitutes grating lobes which is typically an unwanted property since it introduces a directional uncertainty. However, by utilizing the spatial correlation between the CSI in phase 1 and phase 2 the directional uncertainty between can be resolved. In one example, it is determined in phase 1, using a relatively small port distance of e.g. one, that the UE 110 is located in a spatial region covered by a first antenna beam $f_3$. A channel subspace comprising antenna beams $f_1$, $f_3$ and $f_M$ is then determined. In phase 2, a larger port distance of e.g. two is used, e.g. resulting in detection of CSI-RS from any UE located in a larger spatial area, e.g. a channel subspace represented by the combination of antenna beams $f_1$, $f_3$ and $f_M$ shown in FIG. 2. As the channels from the UE will be correlated in time, the network node can further utilize the decided channel subspaces by assuming that the UEs will be located within these also in following or subsequent subframes.

Phase 1 is thus identical to what is described above, but for phase 2 we identify the following differences:

The CSI-RS is transmitted in such a way that it can be shared by multiple UEs whereas above, the phase 2 CSI-RS is typically setup in a UE specific way.

Furthermore, the transmitted CSI-RS may be non-precoded whereas in prior art the CSI-RS is precoded.

If the CSI-RS is precoded, the used precoder does not depend on the CSI report from phase 1. In prior art the precoder is created from the CSI obtained in phase 1.

The proposed solution of the present disclosure provides a method of obtaining high-resolution CSI in Phase 2, having the advantage that overhead due to transmission of CSI-RS does not grow with the number of users.

Phase 1 for a 1D Antenna

In one aspect of the present disclosure, an Nx1 uniform planar array, UPA, digital antenna array is used. The present method includes that a number 2N ports are used to transmit CSI-RS in phase 1. The UE will then measure the transmission and report CSI containing PMI, RI and CQI. The PMI will in turn correspond to a recommended precoder at the network node, e.g. eNodeB, side with a corresponding antenna pattern.

Figure 5:
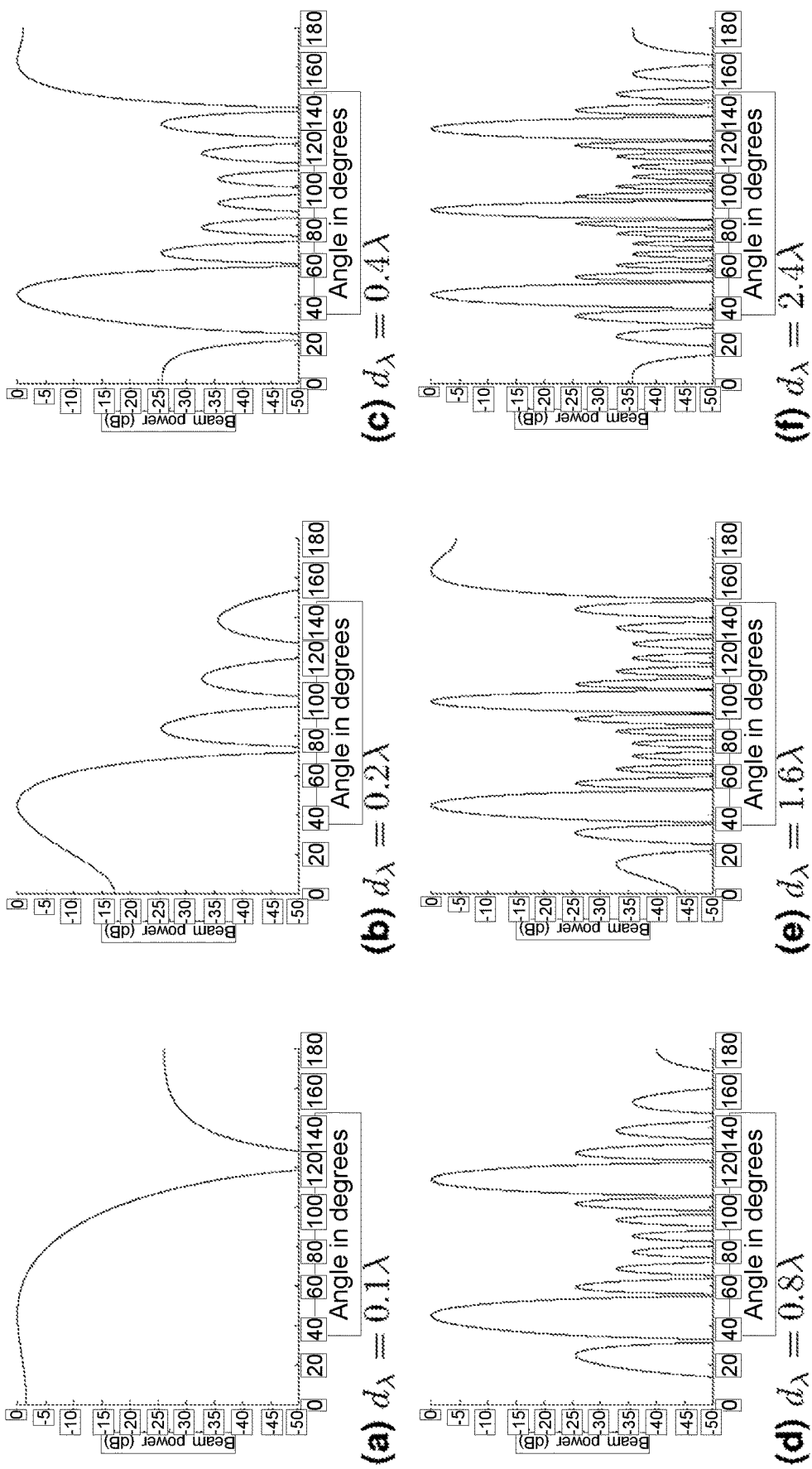
FIG. 5 illustrates the half power beam width of a uniform linear antenna according to one or more embodiments of the present disclosure.
Figure 7A:
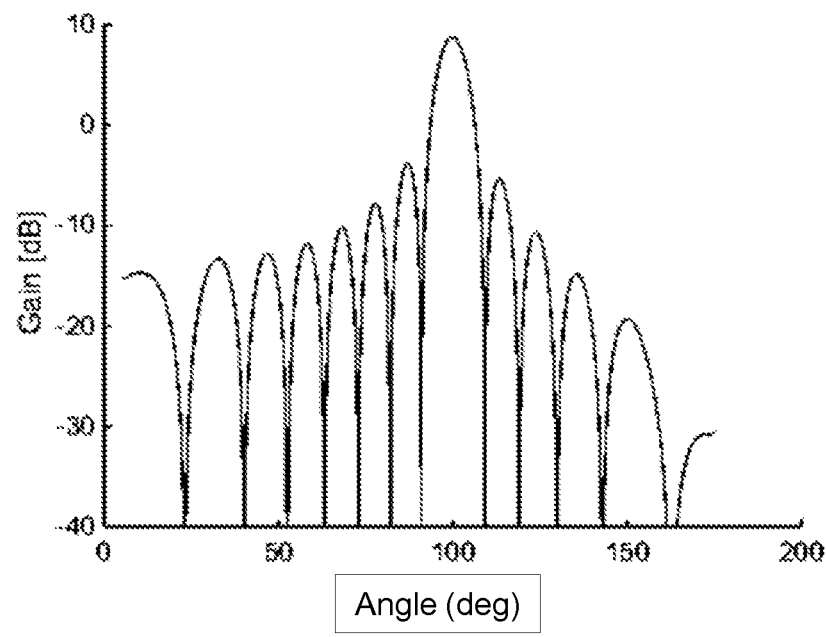
FIGS. 7A and 7B illustrates antenna beam patterns used in different phases according to one or more embodiments of the present disclosure.
Figure 7B:
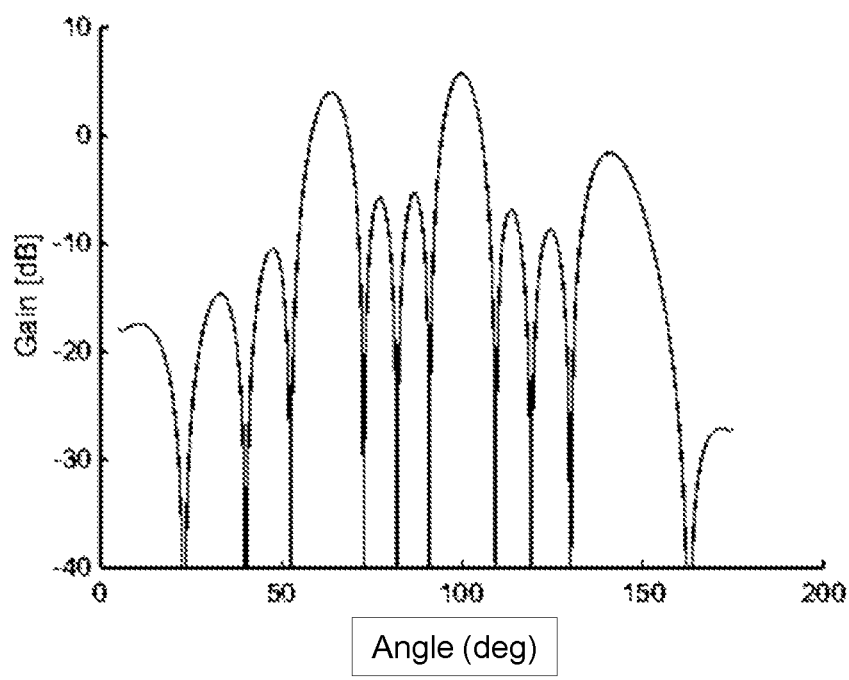

FIGS. 7A and 7B illustrates antenna beam patterns used in phase 1 and phase 2 according to one or more aspects of the present disclosure. FIG. 5 Recommended beam patterns by a UE situated at the angular direction of 100° for an 8-antenna array at the network node or eNodeB, (a) utilizing all antenna elements (phase 1) and (b) puncturing every second element (phase 2).

FIGS. 7A and 7B illustrates antenna beam patterns used for a UE situated at the angular direction of 100° for an 8-antenna array at the network node 100, e.g. a eNodeB. FIG. 7A illustrates an example where all antenna elements are used for transmission of CSI_RS in phase 1. FIG. 7B illustrates an example where every second antenna element is used for transmission of CSI_RS in phase 2.

FIG. 7A illustrates an antenna beam pattern resulting from the use of 2N ports used to transmit CSI-RS. The figure shows a scenario assuming, Type I CSI feedback, where the UE is located in the direction 100 degrees for N=8 with an antenna element separation $d_\lambda$ of 0.8 wavelengths. The precoder will here focus the emitted energy in the direction of the UE 110. In another aspects of the present disclosure, the CSI feedback is instead of Type II.

In yet another aspects of the present disclosure, an analog antenna array is instead used. Here the 2N CSI-RS ports may instead be transmitted using a sequential beam sweep. In other words CSI-RS is transmitted subsequently in time using each of the 2N CSI-RS ports. In one example, in a first time instant 2 CSI-RS ports are used to transmit CSI-RS, one per polarization, corresponding to a certain precoder (and direction). In a second time instant an additional 2 CSI-RS ports are transmitted corresponding to another precoder (direction) and so on. The UE measures on these transmissions of CSI-RS and report CSI for the best (according to some objective function) transmission or potentially a set of the M "best" transmissions for some M.

In yet an aspect of the present disclosure, reciprocity is instead used to obtain CSI-RS during phase 1. In other words, the CSI feedback is based on an uplink transmission from the UE. In this aspect, transmission of CSI-RS during phase 2 use non precoded CSI-RS and is performed by muting antenna elements In one aspect of the present disclosure, K ports of the N×1 antenna is used for Phase 2 CSI-RS transmission by puncturing ports in the sense that a CSI-RS port is connected to only every k:th antenna element where k>1. Hence, this will imply the use of K=2N/k ports for transmitting CSI-RS in phase 2. This transmission may be cell specific in the sense that many UEs could receive the same CSI-RS in phase 2. The CSI-RS may in some aspects of the present disclosure be transmitted using a beam sweeping procedure or alternatively non precoded CSI-RS.

Figure 8A:
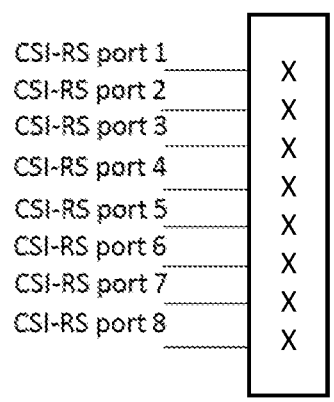
FIGS. 8A and 8B illustrates use of ports in different phases according to one or more embodiments of the present disclosure.
Figure 8B:
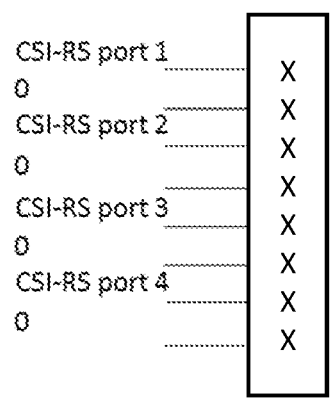

FIGS. 8A and 8B illustrates use of ports in phase 1 and phase 2 according to one or more aspects of the present disclosure. In the example shown in FIG. 8, N=8, k=2 implying K=8 In phase 1, non precoded CSI-RS is transmitted from antenna elements 1-8. In phase 2 a non precoded 8-ports CSI-RS is transmitted from antenna elements 1, 3, 5 and 7 in phase 2. wherein FIG. 8, only one of the polarizations vertical/horizontal/circular is considered. In FIG. 8A, the non precoded CSI-RS from phase 1 is illustrated whereas in FIG. 8B the non precoded CSI-RS from phase 2 is illustrated.

Furthermore, this will imply that the CSI port distance used to transmit the CSI-RS will be larger in phase 2, in this case equal to two, than the smaller port distance, in this case one, used in phase 1. Since the CSI-RS port distance is larger than the antenna separation, the reported PMI:s will typically correspond to precoders comprising grating lobes.

An example of this is illustrated in FIG. 7B, where the UE 110 is assumed to be located in the direction 100 degrees for N=8 with an antenna element separation of 0.8 wavelengths. As can be seen from FIG. 7B, there will exist grating lobes in the obtained CSI-RS due to the relatively larger CSI-RS port distance compared to the port distance in FIG. 7A. Hence, the reported PMI contains a spatial uncertainty in the sense that there are multiple potential directions where the UE may be located given a reported PMI, e.g. any of antenna beams $f_1$, $f_3$ and $f_M$ shown in FIG. 2. However, by utilising the spatial correlation between the CSI-RS in phase 1 and phase 2, the directional uncertainty can be resolved; the antenna beam direction can typically be assumed to be similar in phase 1 and phase 2, and it will thus be possible to detect which of the peaks in the precoder corresponding to the PMI reported in phase 2 that is the one corresponding to the UE's direction. In other words, to determine which antenna beam corresponds to the UE 110, e.g. antenna beam $f_3$ of the antenna beams $f_1$, $f_3$ and $f_M$ shown in FIG. 2.

Figure 9:
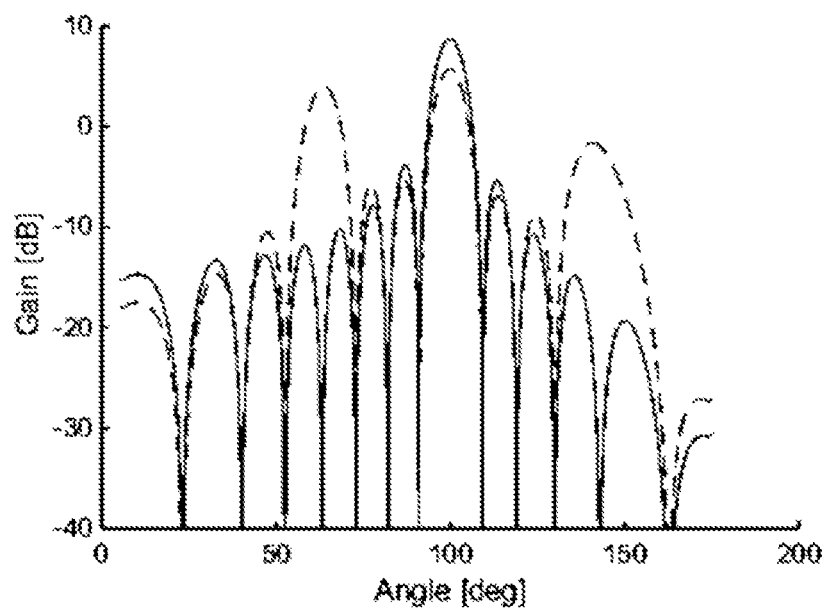
FIG. 9 illustrates antenna beam patterns used in different phases according to one or more embodiments of the present disclosure.

FIG. 9 illustrates antenna beam patterns used in phase 1 and phase 2 according to one or more aspects of the present disclosure. In this figure, recommended beam patterns based on the CSI-RS from phase 1 (FIG. 7A) and phase 2 (FIG. 7B) are shown overlaid in the same figure. This implies that yet another precoder can be derived, based on the CSI reports, that utilizes the entire antenna for data transmission and that does not contain grating lobes. Hence, it will be possible to transmit data using precoders generating antenna patterns like the one illustrated in FIG. 7A despite the fact that the reported CSI from phase 2 corresponds to an antenna pattern looking like the one illustrated in FIG. 7B.

Adjusting CQI

By combining the CSI-RS reports from phase 1 and phase 2, the present disclosure enables to estimate a suitable precoder to be used from the entire antenna array by matching it to the relevant peak of the precoder in the PMI from phase 2. This precoder can then be used for transmitting data, e.g. antenna beam $f_3$ of the antenna beams $f_1$, $f_3$ and $f_M$ shown in FIG. 2.

However, since this resulting precoder will comprise a different beamforming gain, compared to the transmitted CSI-RS in phase 2, there will be a mismatch in the reported CQI and the transmission of data since the CQI was estimated under the assumption of a lower beamforming gain than the beamforming gain used when transmitting data. This is also seen in FIG. 9.

The present disclosure provides several remedies to this problem of differentiating antenna gains or beamforming gains:

In one aspect of the present disclosure, we could compensate for this beamforming gain difference by transmitting the phase 2 CSI-RS with a higher power such that the additional amount of power corresponds to the beamforming gain difference.

In another aspect of the present disclosure, we may inform the UE that the power of the CSI-RS is X dB lower than what is used in the actual data transmission. This will then imply that the UE estimates the channel to be X dB better than it is, which could correspond to the case when the full beamforming gain of the data transmission is included, if X is chosen appropriately.

In one aspect of the present disclosure, we may specify, e.g. in a transmitted signaling message, that there is a power offset between CSI-RS and PDSCH that will compensate for the beamforming gain difference between CSI-RS transmission in phase 2 and the following data transmission.

Phase 2: Precoded CSI-RS

In one aspect of the present disclosure, the K ports, e.g. of the Nx1 antenna, are virtualized for Phase 2 in the sense that a CSI-RS port is connected to a group of k antenna elements using some virtualization. Hence, this will imply the use of K=2N/k ports for transmitting precoded CSI-RS in phase 2. However, the virtualization does not depend on the received and/or reported CSI from phase 1, and the CSI-RS transmission in phase 2 may thus be considered cell specific in the sense that many UEs could receive the same CSI-RS. An example of this is illustrated in FIGS. 8A and 8B, for one of the polarizations, where N=8 and k=2; the use of ports for transmission of CSI-RS for phase 1 is illustrated in FIG. 8A and the use of ports for transmission of CSI-RS for phase 2 is illustrated in FIG. 8B. In one aspect of the present disclosure, the virtualization, in phase 2, from a CSI-RS port to the antenna elements is done using dual polarized beamforming, i.e. using beamforming in both a spatial and a polarization domain. E.g. precoding CSI-RS such that it is precoded over the polarizations and the polarization direction varies with the spatial direction of the CSI-RS port.2D antenna Although previous aspects of the present disclosure, were presented in the context of a one dimensional, 1D, antenna the invention is equally applicable for a two dimensional, 2D, antenna. For a 2D antenna the invention could be applied to one of the horizontal/vertical dimensions or alternatively to both horizontal and vertical dimensions.

Figure 10:
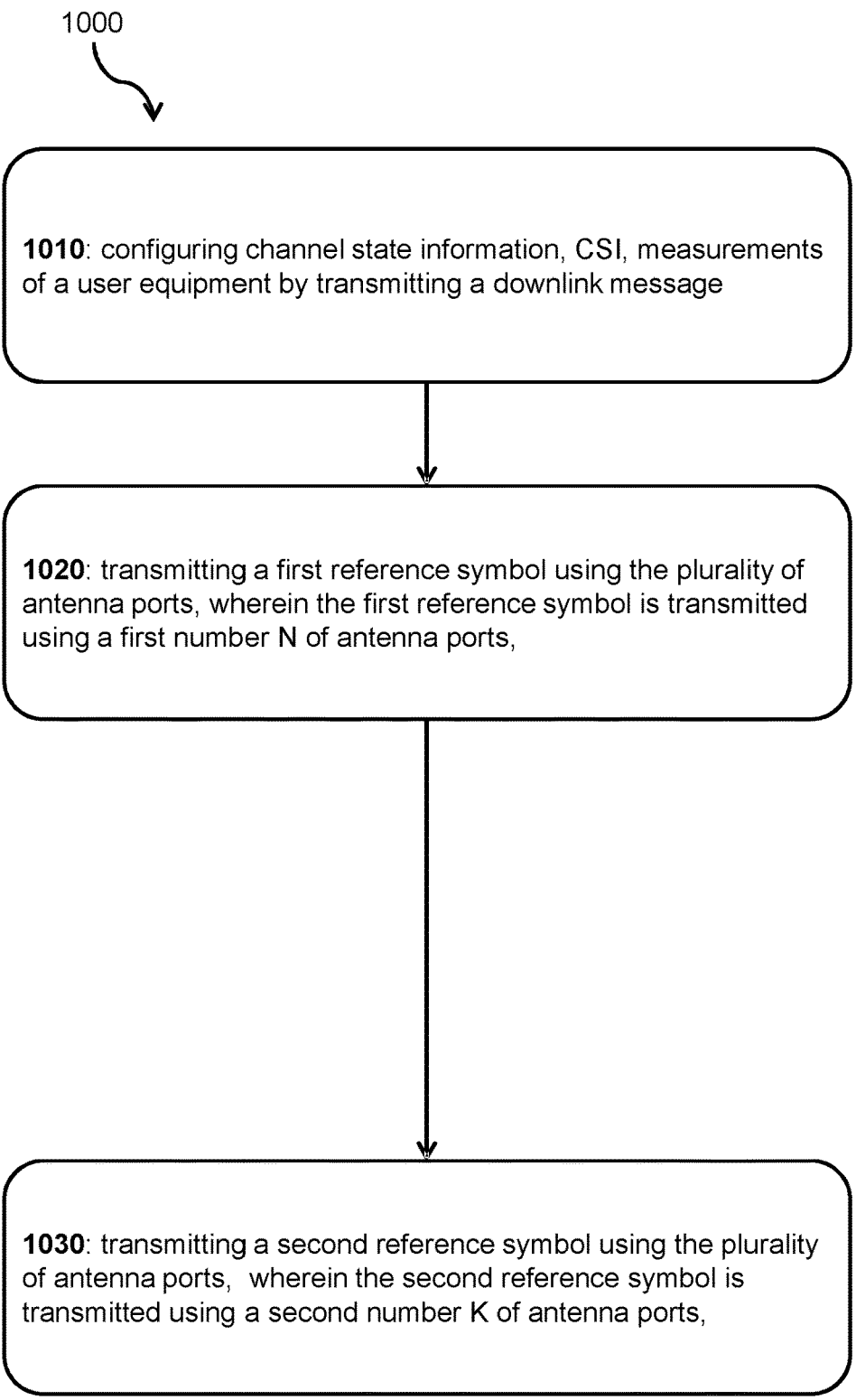
FIG. 10 shows a flowchart of a method performed by a wireless node configured to transmit reference symbols according to one or more embodiments of the present disclosure.

FIG. 10 shows a flowchart of a method 1000 performed by a wireless node 100 for or configured to transmitting reference symbols according to one or more aspects of the present disclosure. The node comprises an antenna with a plurality of antenna ports, the method comprises:

STEP 1010: configuring channel state information, CSI, measurements of a UE 110 by transmitting a downlink message. In one aspect of the present disclosure, the measurements are configured for CSI-RS. In one aspect of the present disclosure, the message is sent on a physical downlink control channel, PDCCH. The message may comprise a CSI-RS measurement configuration.

In one example, the UE receives the message comprising physical resources and reference symbol sequence to use for performing the measurements. The physical resources may comprise a selection of any one of time resources, frequency resources and code resources.

Alternatively or additionally, the channel state information, CSI, measurements are configured for one or more additional UEs. Alternatively or additionally, the channel state information, CSI, measurements are identically configured for all the UEs and the one or more additional UEs.

STEP 1020: transmitting a first reference symbol using the plurality of antenna ports, wherein the first reference symbol is transmitted using a first number N of antenna ports. In one aspect of the present disclosure, the first number N of antenna ports is selected to cover the entire cell coverage area. In one aspect of the present disclosure, the first number N of antenna ports is selected equal to the total number of the plurality of antenna ports. In one aspect of the present disclosure, the first reference symbol is precoded. In one aspect of the present disclosure, the first reference symbol is not precoded. In one aspect of the present disclosure, each of the first number N of antenna ports are used subsequently in time to transmit the first reference symbol.

STEP 1030: transmitting a second reference symbol using the plurality of antenna ports, wherein the second reference symbol is transmitted using a second number K of antenna ports, wherein the first reference symbol is transmitted using a first port distance smaller than a second port distance used when transmitting the second reference symbol, and wherein the K used antenna ports are less than the N used antenna ports.

In one aspect of the present disclosure, the second number K of antenna ports is selected to cover a subset of the cell coverage area by selecting antenna ports corresponding to channel subspaces determined based on CSI feedback. In one aspect of the present disclosure, the second number K of antenna ports is selected to a number less than the first number N. In one aspect of the present disclosure, the second number K of antenna ports is selected to a divisor or an integer divisor or a factor or an integer factor of the first number N. In one aspect of the present disclosure, the second reference symbol is precoded. In one aspect of the present disclosure, the second reference symbol is not precoded. In one aspect of the present disclosure, the second port distance is predetermined. In one aspect of the present disclosure, the second port distance is a multiple or an integer multiple of the first port distance. In one aspect of the present disclosure, dual polarized beamforming is used for transmitting the second reference symbol.

Figure 11:
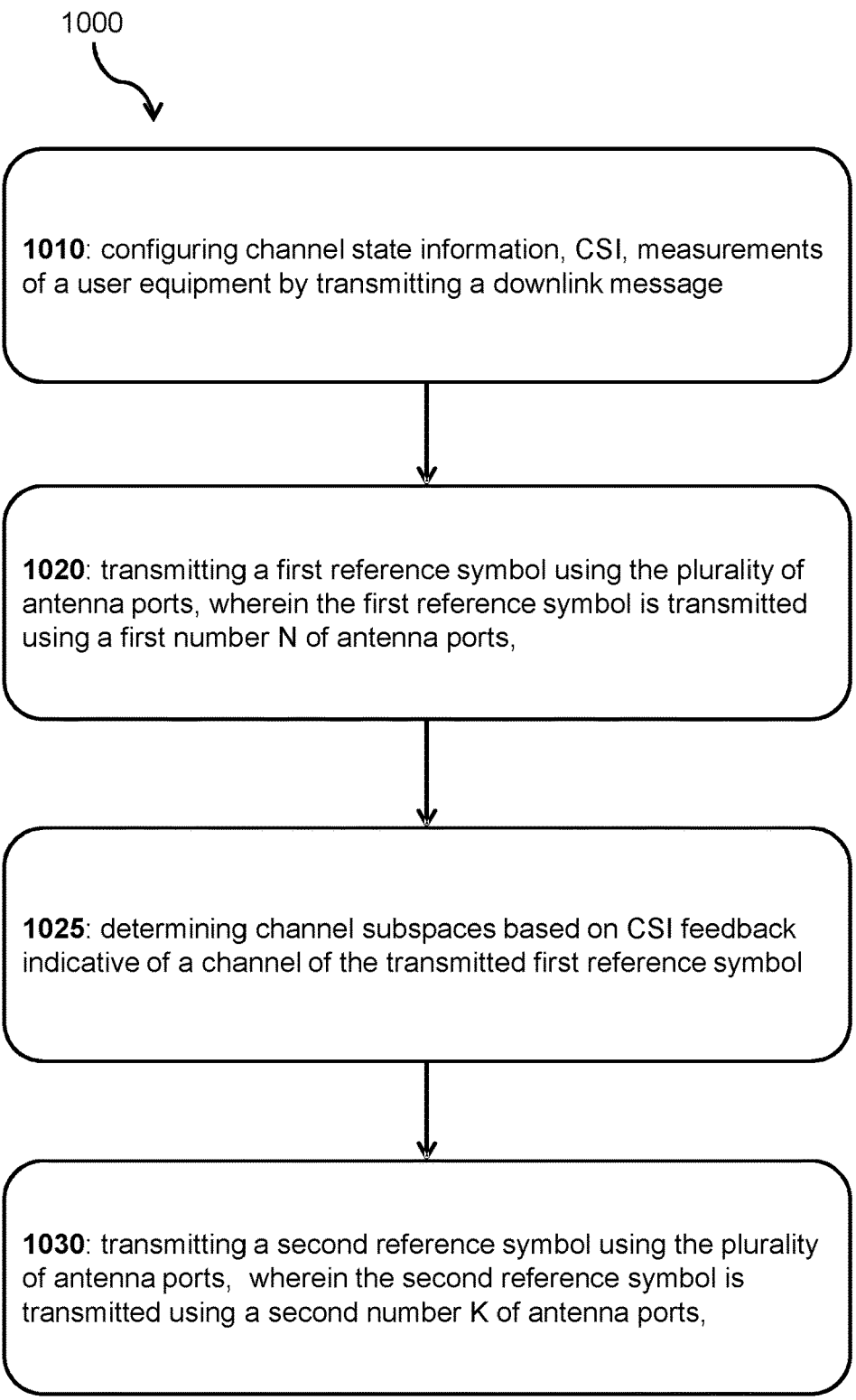
FIG. 11 shows yet an embodiment of the method according to one or more embodiments of the present disclosure.

FIG. 11 shows yet an aspect of the present disclosure of the method 100 according to one or more aspect of the present disclosure. The method 100 further comprises:

STEP 1025: determining channel subspaces based on CSI feedback indicative of a channel of the transmitted first reference symbol.

In one aspect of the present disclosure, the used RS port to antenna element mapping of said second transmitted CSI-RS does not depend on the CSI reported from said first CSI-RS. The used RS port to antenna element mapping of said second transmitted CSI-RS is predetermined, e.g. the port to antenna element mapping selected from a cell-specific set of predetermined configurations. In other words, the determination of the channel subspace is not dependent on the CSI of the transmitted first reference symbol. In one aspect of the present disclosure, the first and second CSI-RS are transmitted using the same spatial direction, e.g. horizontal/horizontal or vertical/vertical. In other words, the first and second CSI-RS are transmitted at least in part using the same spatial direction, e.g. the first CSI-RS is transmitted using horizontal spatial direction and the second CSI-RS is transmitted using both vertical and horizontal spatial direction. It is understood that any combination of spatial direction can be used when transmitting the first and second CSI-RS as long as they are partially using the same spatial direction In one example, the network node 100 decides on or determines a channel subspace, e.g. $f_3$ shown in FIG. 2, where the UE 100 is located. The second CSI-RS can then be transmitted using antenna beam $f_3$ only.

In a further example, a subspace is determined as antenna beams $f_1$, $f_3$ and $f_M$, i.e. the second CSI-RS is transmitted using the antenna beams $f_1$, $f_3$ and $f_M$, e.g. by using every second antenna port.

In a further aspect of the present disclosure, wherein a difference in beamforming gain between transmission of said first CSI-RS and said second CSI-RS is compensated for. According to one aspect, the first CSI-RS and second CSI-RS are transmitted using different transmission power, as further described above under the section "Adjusting CQI". In a further aspect of the present disclosure, wherein configuring the channel state information, CSI, measurements of the UE comprises information of a power offset between the transmission of the first and second CSI-RS, and wherein the UE uses the power offset to compensate the CSI feedback for the power offset. In a further aspect of the present disclosure, wherein configuring the channel state information, CSI, measurements of the UE comprises information of a power offset between a transmission power of an uplink control channel, such as a physical uplink shared control channel, and transmission power of the first or second CSI-RS.

In a further aspect of the present disclosure of the method 100 according to any of FIG. 10 or 11, the method 1000 further comprises receiving first CSI measurements from the UE indicative of CSI of the transmitted first reference symbol, receiving second CSI measurements from the UE indicative of CSI of the transmitted second reference symbol. In one aspect of the present disclosure, the method further comprises adapting a second precoding matrix indicator, PMI, of the second CSI measurements based on a first precoding matrix indicator, PMI, of the first CSI measurements.

In one example, by utilizing the spatial correlation between the received first CSI measurements and the received second CSI measurements, any uncertainty or directional uncertainty can be resolved. The direction from the node 100 to the UE 110 can typically be assumed to be similar and it will thus be possible to detect which of the peaks in the precoder corresponding to the PMI reported in the received second CSI measurements that is the one corresponding to the UE's direction.

In a further aspect of the method 100 according to of any of FIG. 10 or 11, the method 1000 further comprises combining the first CSI measurements and the second CSI measurements and selecting a precoder for an upcoming payload data transmission based on the combined measurements.

In one example, described with reference to FIG. 2, the first reference symbol is transmitted using all antenna beams $f_1$-$f_M$, the second reference symbol is transmitted using antenna beams $f_1$, $f_3$ and $f_M$ and the data is transmitted using precoder/antenna beam $f_3$.

In a further aspect of the method 100 according to of any of FIG. 10 or 11, the second reference symbol is precoded before transmission.

In a further aspect of the method 100 according to of any of FIG. 10 or 11, the second reference symbol is not precoded before transmission.

In a further aspect of the method 100 according to of any of FIG. 10 or 11, the first and second reference symbols are channel state information reference symbols.

It is understood that any of the embodiments described above can all be combined to form additional embodiments.

In one aspect of the present disclosure, a wireless node 100 is provided for transmitting reference symbols, the wireless node comprising an antenna with a plurality of antenna ports, the wireless node further comprising:
a processor, and
a memory, said memory containing instructions executable by said processor, whereby said user terminal is operative to:
configure channel state information, CSI, measurements of a user equipment, UE 110, by transmitting a downlink message,
transmit a first reference symbol using the plurality of antenna ports, wherein the first reference symbol is transmitted using a first number N of antenna ports,
transmit a second reference symbol using the plurality of antenna ports, wherein the second reference symbol is transmitted using a second number K of antenna ports,
wherein the first reference symbol is transmitted using a first port distance smaller than a second port distance used when transmitting the second reference symbol, and wherein the K used antenna ports are less than the N used antenna ports.

In one aspect of the present disclosure, the wireless node 100 is further configured to:
receive first CSI measurements from the UE indicative of CSI of the transmitted first reference symbol,
receive second CSI measurements from the UE indicative of CSI of the transmitted second reference symbol,
adapt a second precoding matrix indicator, PMI, of the second CSI measurements based on a first precoding matrix indicator, PMI, of the first CSI measurements.

In one aspect of the present disclosure, the wireless node is further configured to:
combine the first CSI measurements and the second CSI measurements, and
select a precoder for an upcoming payload data transmission based on the combined measurements.

In one aspect of the present disclosure, the second port distance is predetermined.

In one aspect of the present disclosure, the second port distance is a multiple of the first port distance.

In one aspect of the present disclosure, the second reference symbol is precoded before transmission.

In one aspect of the present disclosure, the second reference symbol is not precoded before transmission.

In one aspect of the present disclosure, the first and second reference symbols are channel state information reference symbols.

In one aspect of the present disclosure, a computer program is provided and comprising computer-executable instructions for causing a wireless node, when the computer-executable instructions are executed on a processing unit comprised in the wireless node 100, to perform any of the method steps described herein.

In one aspect of the present disclosure, a computer program product is provided and comprising a computer-readable storage medium, the computer-readable storage medium having the computer program above embodied therein.

It is understood that any of the aspects or embodiments described above can all be combined to form additional aspects or embodiments.

Figure 12:
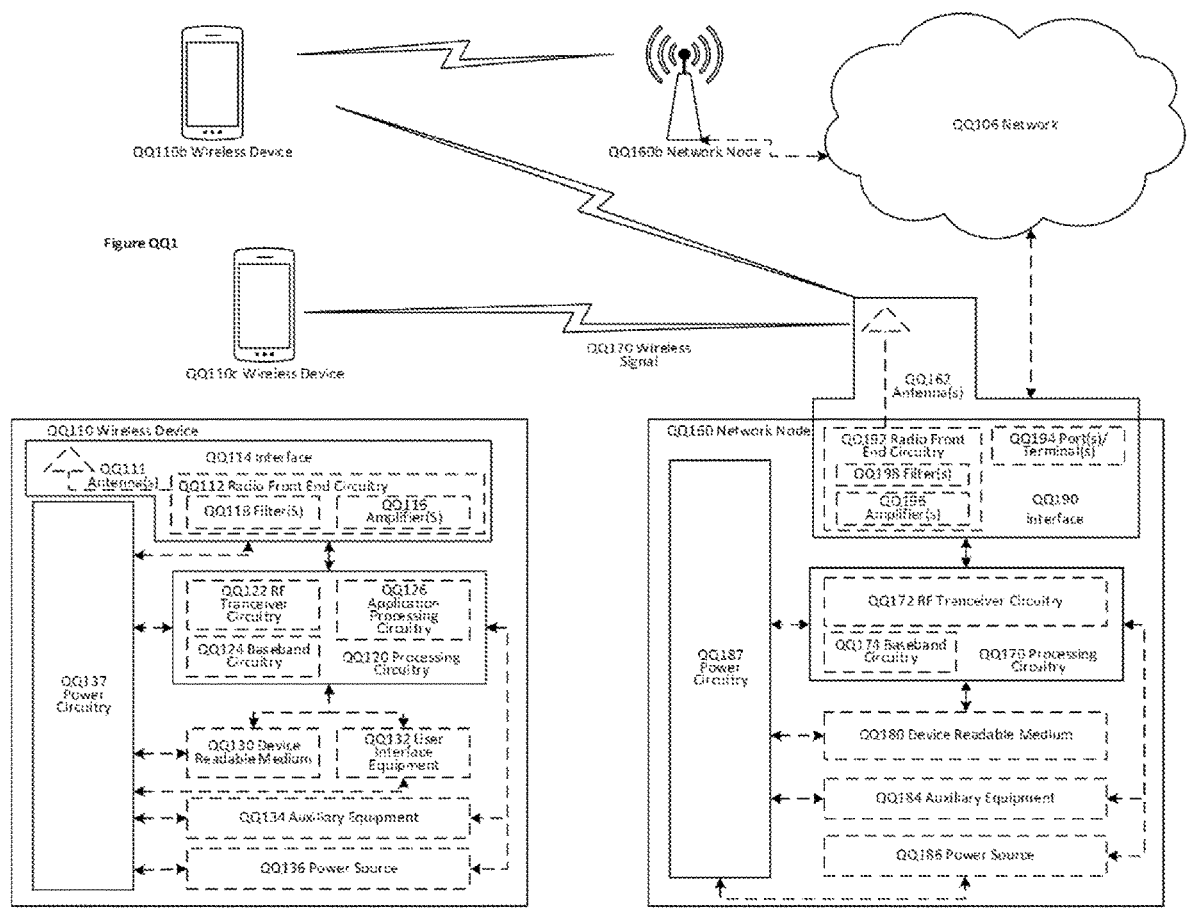
FIG. 12 illustrates a wireless network in accordance with some embodiments.

FIG. 12 illustrates a wireless network in accordance with some aspects of the present disclosure. In the present disclosure the term wireless node 100 is used interchangeably with network nodes QQ160 and QQ160b. In the present disclosure the term UE 110 is used interchangeably with WDs QQ110, QQ110b, and QQ110c.

Although the subject matter described herein may be implemented in any appropriate type of system using any suitable components, the aspects of the present disclosure disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some aspects of the present disclosure, the wireless network may be configured to operate according to specific standards or other types of predefined rules or procedures. Thus, particular aspects of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different aspects of the present disclosure, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160.

Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprises one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet another alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Finally, it should be understood that the disclosure is not limited to the embodiments described above, but also relates to and incorporates all embodiments within the scope of the appended independent claims.

The invention claimed is:

1. A method performed by a wireless node for transmitting reference symbols, the wireless node comprising an antenna with a plurality of antenna ports, the method comprising:
configuring channel state information (CSI) measurements of a user equipment (UE) by transmitting a downlink message;
transmitting a first reference symbol using the plurality of antenna ports, wherein the first reference symbol is transmitted using a first number (N) of antenna ports; and
transmitting a second reference symbol using the plurality of antenna ports, wherein the second reference symbol is transmitted using a second number (K) of antenna ports, wherein:
the first reference symbol is transmitted using the N antenna ports having a first port distance smaller than a second port distance of the K antenna ports used to transmit the second reference symbol,
K is less than N, and
the transmitted first reference symbol is precoded and the transmitted second reference symbol is non precoded.

2. The method of claim 1, further comprising:
receiving first CSI measurements from the UE indicative of CSI of the transmitted first reference symbol;
receiving second CSI measurements from the UE indicative of CSI of the transmitted second reference symbol; and
determining a second precoding matrix indicator (PMI) of the second CSI measurements based on a first PMI of the first CSI measurements.

3. The method of claim 2, further comprising:
combining the first CSI measurements and the second CSI measurements; and
selecting a precoder for an upcoming payload data transmission based on the combined measurements.

4. The method of claim 1, wherein the second port distance is predetermined.

5. The method of claim 1, wherein the second port distance is a multiple of the first port distance.

6. The method of claim 1, wherein the second reference symbol is precoded before transmission.

7. The method of claim 1, wherein the first and second reference symbols are channel state information reference symbols.

8. A wireless node configured to transmit reference symbols, the wireless node comprising:
an antenna with a plurality of antenna ports;
a processor operably coupled to the antenna; and
a memory containing instructions executable by said processor, wherein execution of the instructions configures the wireless node to:
configure channel state information (CSI) measurements of a user equipment (UE) by transmitting a downlink message;
transmit a first reference symbol using the plurality of antenna ports, wherein the first reference symbol is transmitted using a first number (N) of antenna ports; and
transmit a second reference symbol using the plurality of antenna ports, wherein the second reference symbol is transmitted using a second number (K) of antenna ports, wherein:
the first reference symbol is transmitted using the N antenna ports having a first port distance smaller than a second port distance of the K antenna ports used to transmit the second reference symbol,
K is less than N, and
the transmitted first reference symbol is precoded and the transmitted second reference symbol is non precoded.

9. The wireless node of claim 8, wherein execution of the instructions further configures the wireless node to:
receive first CSI measurements from the UE indicative of CSI of the transmitted first reference symbol;
receive second CSI measurements from the UE indicative of CSI of the transmitted second reference symbol; and
determine a second precoding matrix indicator (PMI) of the second CSI measurements based on a first PMI of the first CSI measurements.

10. The wireless node of claim 9, wherein execution of the instructions further configures the wireless node to:
combine the first CSI measurements and the second CSI measurements; and
select a precoder for an upcoming payload data transmission based on the combined measurements.

11. The wireless node of claim 8, wherein the second port distance is predetermined.

12. The wireless node of claim 8, wherein the second port distance is a multiple of the first port distance.

13. The wireless node of claim 8, wherein the second reference symbol is precoded before transmission.

14. The wireless node of claim 8, wherein the first and second reference symbols are channel state information reference symbols.

15. A non-transitory, computer-readable medium storing computer-executable instructions that, when executed by processing circuitry of a wireless node having an antenna with a plurality of antenna ports, configure the wireless node to perform operations corresponding to the method of claim 1.

* * * * *